United States Patent
Park

(10) Patent No.: US 8,923,839 B2
(45) Date of Patent: Dec. 30, 2014

(54) METHOD AND DEVICE FOR SYNCHRONIZATION BETWEEN A MOBILE DEVICE AND A DISPLAY DEVICE, THE MOBILE DEVICE, AND THE DISPLAY DEVICE

(71) Applicant: Alticast Corporation, Seoul (KR)

(72) Inventor: Hwan-Hyo Park, Seoul (KR)

(73) Assignee: Alticast Corporation, Seoul (KR)

( * ) Notice: Subject to any disclaimer, the term of this patent is extended or adjusted under 35 U.S.C. 154(b) by 69 days.

(21) Appl. No.: 13/729,956

(22) Filed: Dec. 28, 2012

(65) Prior Publication Data

US 2013/0171980 A1    Jul. 4, 2013

(30) Foreign Application Priority Data

Dec. 29, 2011    (KR) ........................ 10-2011-0145880

(51) Int. Cl.
- *H04W 8/22* (2009.01)
- *H04N 21/45* (2011.01)
- *H04N 21/414* (2011.01)
- *H04N 21/41* (2011.01)
- *H04L 29/08* (2006.01)
- *H04W 4/02* (2009.01)
- *H04N 21/422* (2011.01)

(52) U.S. Cl.
CPC ............. *H04W 8/22* (2013.01); *H04N 21/4524* (2013.01); *H04N 21/41407* (2013.01); *H04N 21/4126* (2013.01); *H04L 67/1095* (2013.01); *H04W 4/02* (2013.01); *G08C 2201/93* (2013.01); *H04N 21/42202* (2013.01); *G08C 2201/70* (2013.01)
USPC ............................... 455/420; 348/135; 725/24

(58) Field of Classification Search
CPC ............................... H04W 8/22; G06F 3/1446
USPC .............. 455/420; 370/350; 725/24; 348/135
See application file for complete search history.

(56) References Cited

U.S. PATENT DOCUMENTS

2008/0043715 A1 * 2/2008 Ijiri ............................. 370/350
2012/0324502 A1 * 12/2012 Amsterdam et al. ............ 725/24

* cited by examiner

*Primary Examiner* — Phuoc H Doan
(74) *Attorney, Agent, or Firm* — Edwards Wildman Palmer LLP

(57) ABSTRACT

A method and device for synchronization between a mobile device and a display device are disclosed. A synchronization device for synchronization between a mobile device and a display device includes: a storage part configured to store first position information of each of a plurality of display devices; a receiving part configured to receive second position information of the mobile device; and a synchronizing part configured to synchronize the mobile device with a display device having the first position information corresponding to the second position information, from among the plurality of display devices. According to certain embodiments of the invention, a mobile device may be synchronized with multiple display devices using the position information of the mobile device, thus allowing the user to conveniently access various services through multiple display devices.

13 Claims, 8 Drawing Sheets

METHOD AND DEVICE FOR SYNCHRONIZATION BETWEEN A MOBILE DEVICE AND A DISPLAY DEVICE, THE MOBILE DEVICE, AND THE DISPLAY DEVICE

CROSS-REFERENCE TO RELATED APPLICATIONS

This application claims the benefit of Korean Patent Application No. 10-2011-0145880, filed with the Korean Intellectual Property Office on Dec. 29, 2011, the disclosure of which is incorporated herein by reference in its entirety.

BACKGROUND

1. Technical Field

Embodiments of the invention relate to a method and device for synchronization between a mobile device and a display device, and to the mobile device and the display device; more particularly, the invention relates to a method and device for synchronizing a mobile device and a display device using position information.

2. Description of the Related Art

Several techniques have been proposed for performing synchronization between a mobile device carried by a person and a display device, allowing the user to control the display device using the mobile device.

FIG. 1 is a diagram illustrating an example of controlling a display device using a mobile device.

Referring to FIG. 1, when the display device 101 transmits an application to the mobile device 103, the mobile device 103 may execute the application, receive certain information from the user as input, and transmit it to the display device 101 for synchronization. When synchronization is thus achieved, the user is able to control the display device 101 using the mobile device 103.

However, when there are more than one display device in a particular space (home, office, etc.), the user is faced with the inconvenience of having to perform synchronization individually with each of the multiple display devices.

SUMMARY

An aspect of the invention is to provide a method and device for synchronization between a mobile device and a display device, a mobile device that performs synchronization with a display device, and a display device that performs synchronization with the mobile device, which can resolve the problem described above.

One aspect of the invention provides a synchronization device for synchronization between a mobile device and a display device, where the synchronization device includes: a storage part configured to store first position information of each of a plurality of display devices; a receiving part configured to receive second position information of the mobile device; and a synchronizing part configured to synchronize the mobile device with a display device having the first position information corresponding to the second position information, from among the plurality of display devices.

Here, the first position information can include at least one of first area information and first direction information, the first area information relating to areas in which the plurality of display devices are positioned, and the first direction information relating to directions in which the plurality of display devices are pointing, while the second position information can include at least one of second area information and second direction information, the second area information relating to an area in which the mobile device is positioned, and the second direction information relating to a direction in which the mobile device is pointing.

The synchronizing part can select a display device having the first area information corresponding to the second area information, from among the plurality of display devices, and synchronize the mobile device with the selected display device, where a corresponding between area information means that the first area information and the second area information are alike.

If there are a multiple number of display devices that have the first area information corresponding to the second area information, the synchronizing part can select a display device having the first direction information corresponding to the second direction information, from among the display devices having the first area information corresponding to the second area information, and can synchronize the mobile device with the selected display device, where a corresponding between direction information means that the mobile device and the display device point in directions facing each other.

If there are a plurality of display devices having the first direction information corresponding to the second direction information, the synchronizing part can select a display device closest to the mobile device, from among the display devices having the first direction information corresponding to the second direction information, and can synchronize the mobile device with the selected display device.

The storage part can further store first profile information of the display device synchronized with the mobile device and second profile information of the mobile device, while the synchronization device can further include a profile transmitting part configured to transmit the first profile information to the mobile device and transmit the second profile information to the synchronized display device, so that the mobile device and the synchronized display device may perform a particular action based on the first profile information or the second profile information.

The first profile information can include type information of the synchronized display device, and the second profile information can include at least one of type information of the mobile device and information on a user using the mobile device.

The user information can include at least one of an age and a gender of the user, and based on the user information, the synchronized display device can customize or restrict an image or information provided on the mobile device.

The particular action mentioned above can include at least one of: sharing an image displayed on the mobile device or the synchronized display device with each other, controlling the synchronized display device by using the mobile device, controlling the mobile device by using the synchronized display device, displaying supplementary information on the mobile device for an image displayed on the synchronized display device, and displaying on the synchronized display device information requested by a user of the mobile device.

The mobile device can obtain the second direction information by using at least one of a geomagnetic sensor, a gyro sensor, and a gravity sensor included in the mobile device.

If there are a multiple number of mobile devices having the second position information corresponding to the first position information of any one of the plurality of display devices, the synchronizing part can synchronize the plurality of mobile devices with the one display device such that a screen included in the one display device is divided and controlled by the plurality of mobile devices.

If a screen included in the display device to be synchronized with the mobile device has a size greater than or equal to a preset value, the synchronizing part can synchronize the mobile device with the to-be-synchronized display device such that the mobile device controls a partial area of the screen.

Another aspect of the invention provides a mobile device that performs synchronization with a display device, where the mobile device includes: a receiving part configured to receive first position information of each of a plurality of display devices; a measuring part configured to measure second position information of the mobile device; and a synchronizing part configured to synchronize the mobile device with a display device having the first position information corresponding to the second position information, from among the plurality of display devices.

Yet another aspect of the invention provides a display device that performs synchronization with a mobile device, where the display device includes: a storage part configured to store first position information of the display device; a receiving part configured to receive second position information of the mobile device; and a synchronizing part configured to synchronize the display device with the mobile device if the second position information corresponds to the first position information.

According to certain embodiments of the invention, a mobile device may be synchronized with multiple display devices using the position information of the mobile device, thus allowing the user to conveniently access various services through multiple display devices.

Additional aspects and advantages of the present invention will be set forth in part in the description which follows, and in part will be obvious from the description, or may be learned by practice of the invention.

DETAILED DESCRIPTION

Figure 1:
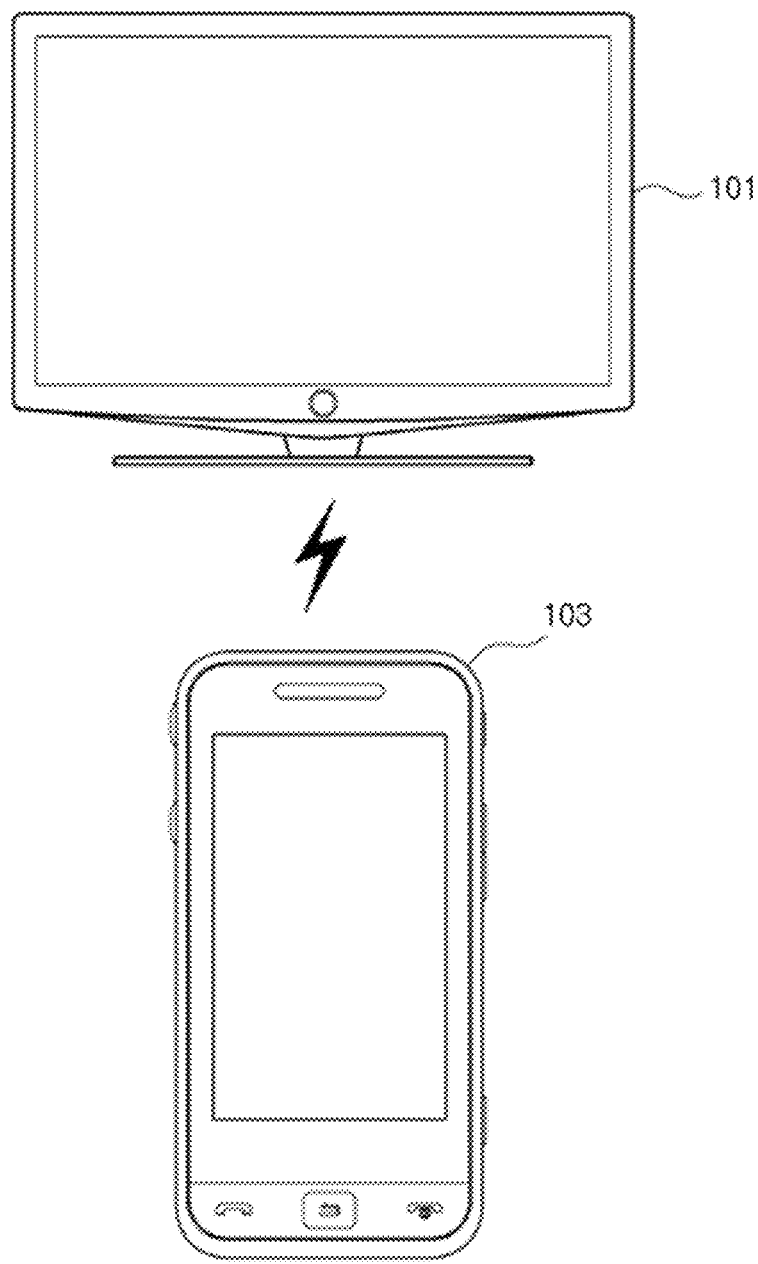
FIG. 1 is a diagram used for illustrating an example of controlling a display device using a mobile device.

As the present invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the present invention. In describing the drawings, like reference numerals are used for like elements.

Certain embodiments of the invention will be described below in more detail with reference to accompanying drawings.

Figure 2:
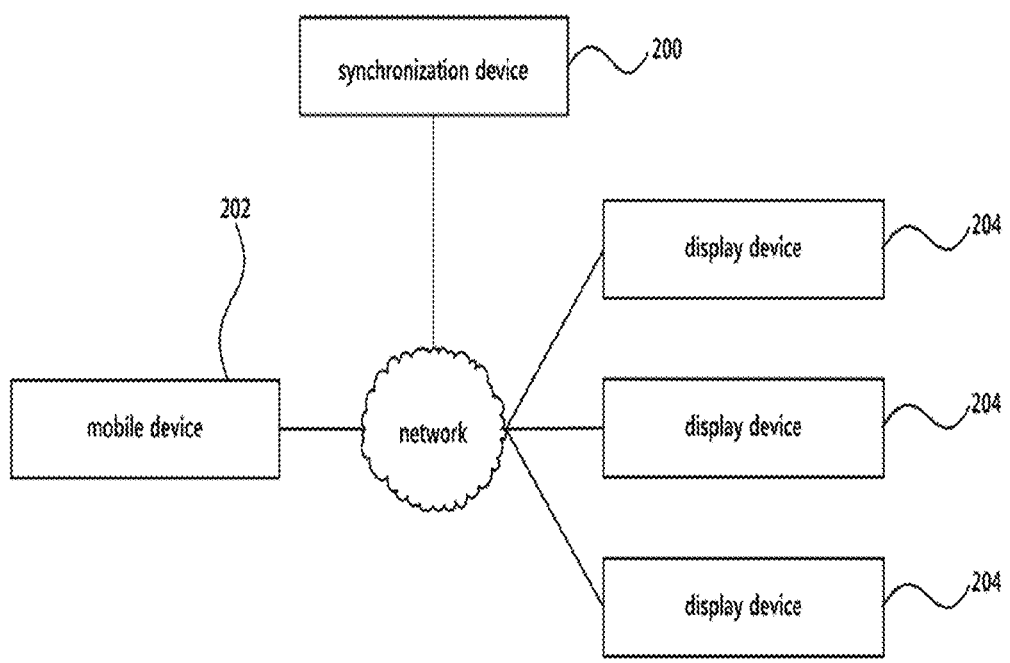
FIG. 2 illustrates a synchronization system for a mobile device and multiple display devices according to an embodiment of the invention.

FIG. 2 illustrates a synchronization system for a mobile device and multiple display devices according to an embodiment of the invention.

As illustrated in FIG. 2, a synchronization system according to an embodiment of the invention can include a synchronization device 200, and a mobile device 202 and one or more display devices 204 connected over a network with the synchronization device 200.

Here, a network can include wired networks, such as the Internet and dedicated lines, as well as wireless networks, such as the wireless Internet, mobile communication networks, broadcast networks, and satellite networks.

A network according to an embodiment of the invention can also be a network using near-field wireless protocols such as Bluetooth and Zigbee.

The mobile device 202 can include any mobile device that can be carried by a user, such as a cell phone, smart phone, PDA, PAD, etc.

The display devices 204 can include any device equipped with a display module for displaying an image, such as a TV set, an electronic picture frame, a projection screen, etc.

The synchronization device 200 may store first position information of the multiple number of display devices 204 positioned within a particular space. Also, the synchronization device 200 may receive second position information of the mobile device 202 from the mobile device 202, and may perform synchronization between the mobile device 202 and the display device having the first position information corresponding to the second position information, from among the multiple number of display devices 204.

In an embodiment of the invention, a corresponding between position information can mean that the display device 204 and the mobile device 202 are positioned in the same area and point in directions facing each other.

Here, the first position information may include at least one of first area information, regarding the areas in which the multiple number of display devices 204 are positioned, and first direction information, regarding the directions in which the multiple display devices 204 are pointing. Also, the second position information may include at least one of second area information, regarding the area in which the mobile device 202 is positioned, and second direction information, regarding the direction in which the mobile device 202 is pointing. The first position information and second position information are described later in more detail with reference to the relevant drawing.

Synchronization is to interconnect the mobile device 202 with the display device 204 by way of a network, and to state that the mobile device 202 and the display device 204 are synchronized can have various meanings.

For example, an image of the display device 204 and an image of the mobile device 202 can be shared with each other, the display device 204 can be controlled using the mobile device 202, or the mobile device 202 can be controlled using the display device 204. Also, the mobile device 202 can display supplementary information for an image displayed on the display device 204, or the display device 204 can display information requested by the user of the mobile device 202.

While the above descriptions are provided using an example in which the synchronization device 200 is separate from the mobile device 202, the invention is not thus limited. It is apparent to those skilled in the art that the synchronization device 200 can be a device built into the mobile device 202 or a display device 204, or that the synchronization device can be a server that performs synchronization between the mobile device 202 and the display device 204 by way of a network, for example. For convenience, the following descriptions will be provided using an example in which the synchronization device 200 is a server connected over a network with the mobile device 202 and the display device 204.

Figure 3:
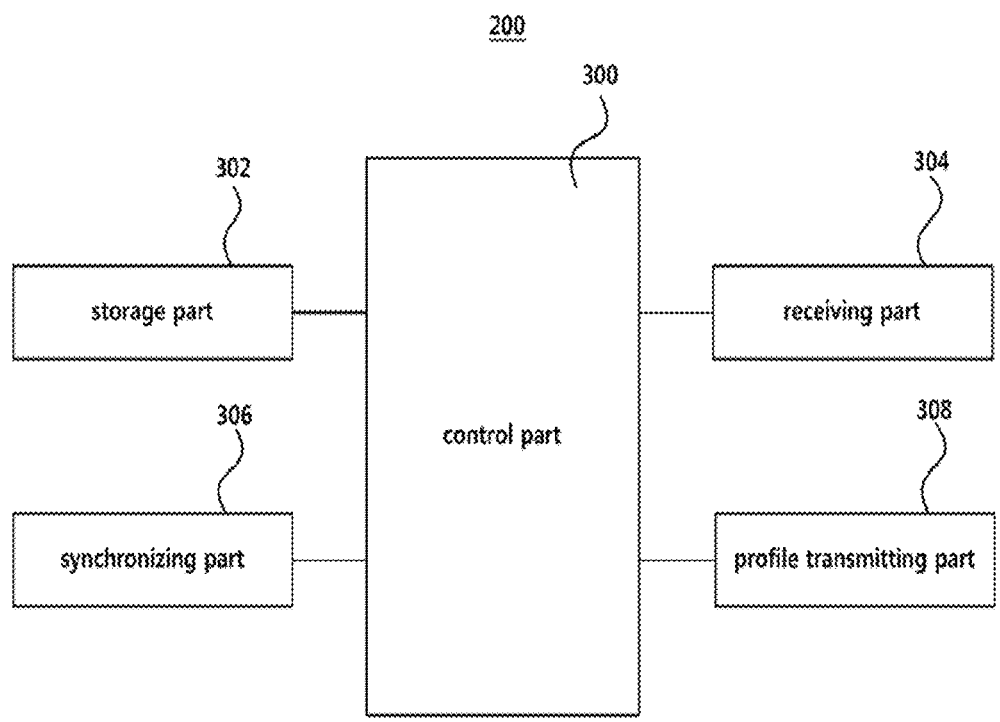
FIG. 3 is a block diagram illustrating the detailed composition of a synchronization device according to an embodiment of the invention.

FIG. 3 is a block diagram illustrating the detailed composition of a synchronization device according to an embodiment of the invention.

As illustrated in FIG. 3, the synchronization device 200 can include a control part 300, a storage part 302, a receiving part 304, a synchronizing part 306, and a profile transmitting part 308.

The control part 300 may control the overall actions of the components of the synchronization device 200.

The storage part 302 may store the first position information of each of the multiple number of display devices 204. If the position information of one of the display devices 204 is changed, the storage part 302 can receive the changed first position information from the one display device to update the changed information.

Figure 4:
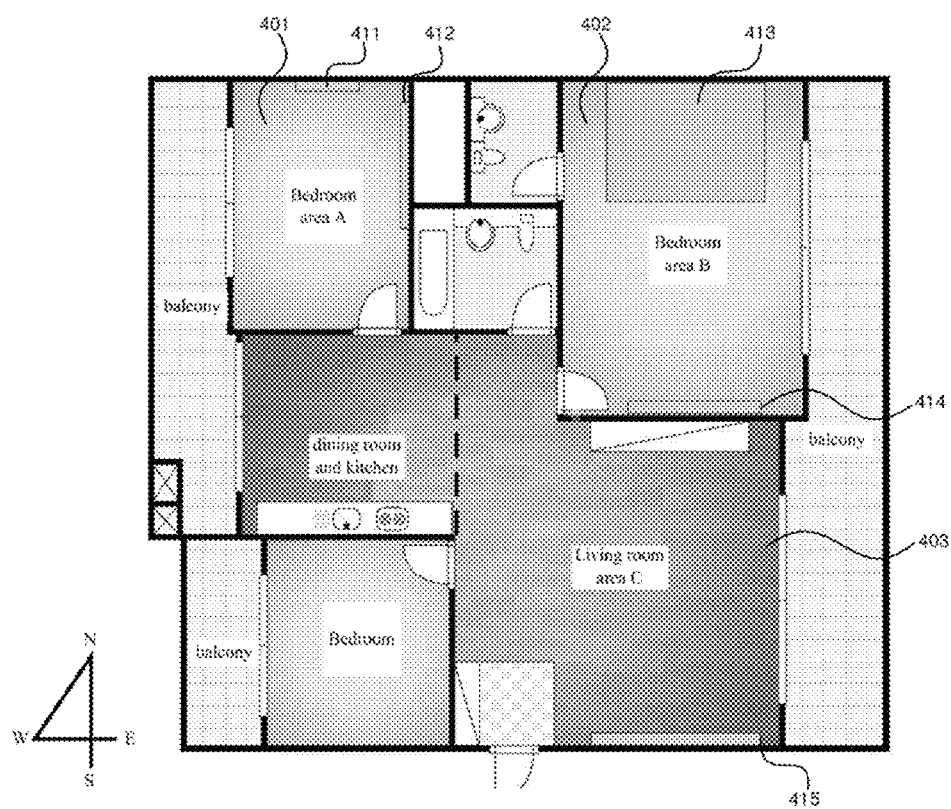
FIG. 4 is a plan view used for illustrating first position information according to an embodiment of the invention.

FIG. 4 is a plan view used for illustrating first position information according to an embodiment of the invention.

In FIG. 4, it is assumed that a particular space is divided into area A 401, area B 402, and area C 403.

That is, a multiple number of display devices 411, 412, 413, 414, 415 can each be positioned in a multiple number of areas 401, 402, 403 within a particular space, and each of the display devices 411, 412, 413, 414, 415 can have a different pointing direction.

According to an embodiment of the invention, the first position information may include first area information, regarding the areas in which the display devices 411, 412, 413, 414, 415 are positioned, and first direction information, regarding the directions in which the display devices 411, 412, 413, 414, 415 are pointing, in other words, the directions in which images are displayed.

For example, display device A 411 may be an electronic picture frame installed on a wall surface; its first area information would be area A 401, and its first direction information would be the southward direction. Display device B 412 may be a TV panel installed on a wall surface in area A 401; its first area information would be area A 401, and its first direction information would be the westward direction.

Display device C 413 may be a projection screen installed on the ceiling of area B 402; its first area information would be area B 402, and its first direction information would be the direction towards the floor of the room. Display device D 414 may be a TV panel installed on a wall surface in area B 402; its first area information would be area B 402, and its first direction information would be the northward direction.

Also, display device E 415 may be a TV panel installed on a wall surface in area C 403; its first area information would be area C 403, and its first direction information would be the northward direction.

As described above, the multiple number of devices may have fixed first position information in the particular space, and this information may be stored in the storage part 302.

The synchronization device 200 is described further, referring again to FIG. 3.

The receiving part 304 may receive the second position information of the mobile device 202. Here, the receiving part 304 can receive the second position information from the mobile device 202 at preset times, or receive the second position information from the mobile device 202 whenever the second position information of the mobile device 202 is changed.

According to an embodiment of the invention, the second position information may include second area information, regarding the area in which the mobile device 202 is positioned, and second direction information, regarding the direction in which the mobile device 202 is pointing.

The position of the mobile device 202 can be estimated using various technologies for localization within a room, such as by using referencing radio signals within a particular area, communicating with one or more sensors within a particular area, and so on. A detailed description of this matter will not be provided here, as this is not the most important feature of the invention.

The mobile device 202 can estimate its position and identify which area it is located in, and can then transmit the relevant information, i.e. the second area information, to the receiving part 304. Alternately, the mobile device 202 may transmit the particular coordinates at which it is positioned to the receiving part 304, and the synchronization device 200 may identify which area the particular coordinates are located in, to obtain the second area information of the mobile device 202.

According to an embodiment of the invention, the coordinates of the mobile device 202 can be estimated through radio signal strengths received from one or more access points positioned within short distances.

The mobile device 202 can also estimate its position using a built-in geomagnetic sensor, gyro sensor, or gravity sensor.

If it is capable of receiving GPS signals, it can also estimate its position using GPS signals. The mobile device 202 can use at least one of a geomagnetic sensor, a gyro sensor, and a gravity sensor included in the mobile device 202, to obtain the second direction information relating to the direction pointed by the mobile device 202, and may transmit the second direction information to the receiving part 304.

Then, the synchronizing part 306 may synchronize the mobile device 202 with the display device having first position information that corresponds to the second position information from among the multiple number of display devices 204.

To be more specific, the synchronizing part 306 may select, from the multiple number of display devices, a display device having the first area information that is the same as the second area information, and may synchronize the mobile device 202 with the selected display device.

Here, a corresponding between area information may mean that the first area information and the second area information are alike.

If there are a multiple number of display devices that are located in a first area, the synchronizing part 306 can select, from the multiple number of display devices located in the first area, a display device having a direction corresponding to the second direction information of the mobile device, and may synchronize the mobile device 202 with the selected display device.

Here, a corresponding between direction information can mean that the mobile device 202 and the display device point in directions facing each other.

If there are a multiple number of display devices that correspond to the second area information and the second direction information of the mobile device, the synchronizing part 306 can select the display device closest to the mobile device and synchronize the selected display device with the mobile device.

Figure 5:
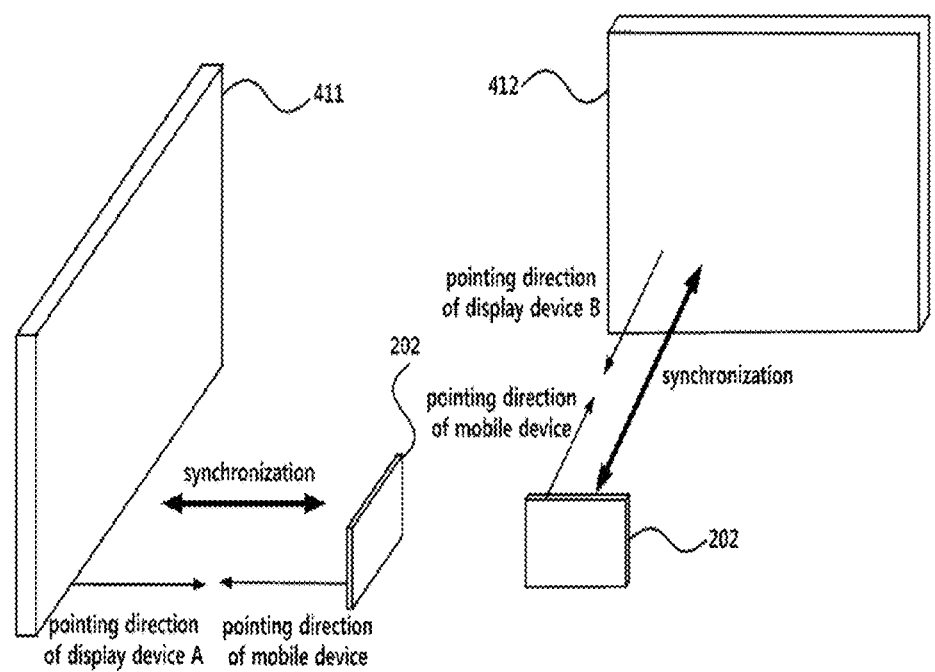
FIG. 5 is a diagram for illustrating a synchronization between a mobile device and a display device according to an embodiment of the invention.
Figure 6:
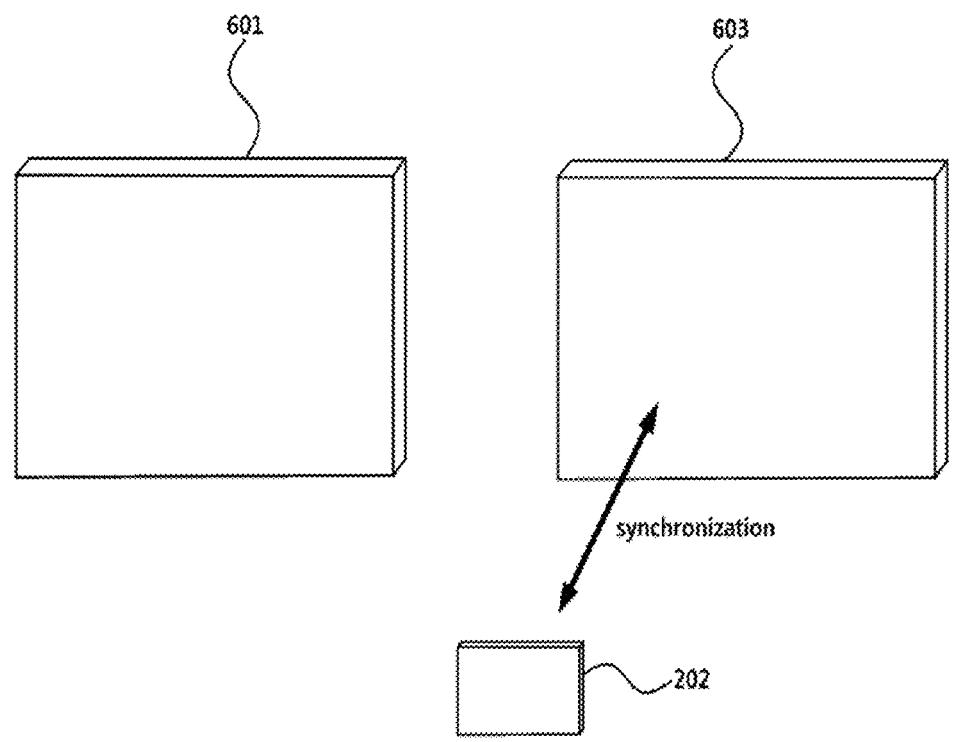
FIG. 6 is a diagram for illustrating a synchronization between a mobile device and a display device according to an embodiment of the invention.
Figure 7:
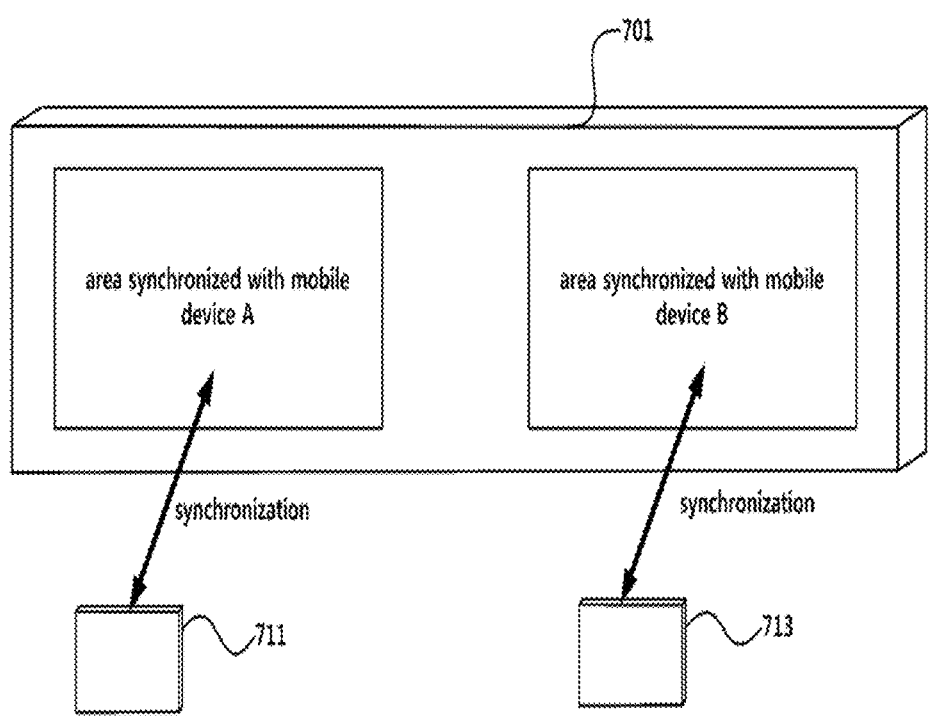
FIG. 7 is a diagram for illustrating a synchronization between a mobile device and a display device according to an embodiment of the invention.

A method of synchronizing a mobile device 202 with a display device at the synchronizing part 306 is described below with reference to FIGS. 4 through 7. FIG. 5 through FIG. 7 are diagrams for illustrating synchronization between a mobile device and a display device according to an embodiment of the invention.

If the second area information received from the mobile device 202 is area C 403, then the display device present in area C 403 is display device E 415 only. Therefore, the synchronizing part 306 can perform synchronization between the mobile device 202 and display device E 415, without having to consider the second direction information of the mobile device 202.

Also, if the second area information received from the mobile device 202 is area A 401, then the mobile device 202 can be synchronized with either one of display device A 411 or display device B 412, which are both present in area A 401.

If the second direction information of the mobile device 202 is the northward direction, then the synchronizing part 306 can perform synchronization between the mobile device 202 and display device A 411, which points in the southward direction, but if the second direction information of the mobile device 202 is the eastward direction, then the synchronizing part 306 can perform synchronization between the mobile device 202 and display device B 412, which points in the westward direction.

That is, synchronization may be performed if the direction in which the mobile device 202 is pointing is opposite to the direction in which the display device is pointing.

Looking at FIG. 5 for more detail, the mobile device 202 can be synchronized with display device A 411 or display device B 412, depending on the direction in which the mobile device 202 is pointing.

Referring again to FIG. 4, if the second area information received from the mobile device 202 is area B 402, then the mobile device 202 can be synchronized with either display device C 413 or display device D 414. That is, if the user is sitting on the bed and pointing in the direction of display device D 414, the synchronizing part 306 can perform synchronization between the mobile device 202 and display device D 414, and if the user is lying on the bed and pointing at display device C 413 mounted on the ceiling, then the synchronizing part 306 can perform synchronization between the mobile device 202 and display device C 413.

Referring to FIG. 6, it can be seen that display device A 601 and display device B 603, both of which have first direction information corresponding to the second direction information of the mobile device 202, are present in the same area. In this case, the synchronizing part 306 can select display device B 603 for synchronization with the mobile device 202, as it is closer to the mobile device 202.

Referring to FIG. 7, display device A 701 can include a large screen, and mobile device A 711 can be positioned in front of a left portion of the screen. In this case, the synchronizing part 306 can synchronize mobile device A 711 with display device A 701 such that mobile device A 711 controls the left portion of the large screen.

Also, mobile device A 711 and mobile device B 713 can be present, both of which have second position information corresponding to the first position information of display device A 701. In this case, the synchronizing part 306 can synchronize display device A 701 with mobile device A 711 and mobile device B 713 such that mobile device A 711 and mobile device B 713 divide the screen included on display device A 701 and control each part.

As the synchronizing part 306 performs synchronization for the display device having first position information corresponding to the second position information of the mobile device 202 as described above, the user is able to easily obtain synchronization for several display devices simply by pointing to a display device in a particular area, without separately performing an elaborate procedure.

The description of the synchronization device 200 continues, referring again to FIG. 3.

According to an embodiment of the invention, the storage part 302 can further store first profile information of the display devices 204 and second profile information of the mobile device 202. Here, the second profile information can be received from the mobile device 202 and stored.

In this case, the profile transmitting part 308 may transmit the second profile information of the mobile device 202 to the display device 204 synchronized with the mobile device 202, and transmit the first profile information of the synchronized display device to the mobile device 202.

Here, the first profile information can include type information of the synchronized display device, while the second profile information can include at least one of type information of the mobile device 202 and information on the user using the mobile device 202.

The mobile device 202 and the synchronized display device, having received profile information, may perform particular actions based on the first profile information or second profile information.

One reason for transmitting profile information is that the actions performed between the synchronized devices can differ depending on the type of display device 204 or the type of mobile device 202 and the user using the mobile device 202.

For example, if the type of the synchronized display device is an electronic picture frame, possible actions can include displaying a picture stored in the electronic picture frame on the mobile device 202 or displaying a picture stored in the mobile device 202 on the electronic picture frame.

If the type of the synchronized display device is a projection device, a possible action can include having an image displayed on the mobile device 202 also be displayed through the projection device.

Also, if the type of the synchronized display device is a TV set, possible actions can include having the image shown on the TV set also be provided on the mobile device 202, or providing supplementary information on the mobile device 202 for an image provided on the TV set. The mobile device 202 can also be used to perform the function of a remote controller for the TV set.

According to an embodiment of the invention, the image or information provided from the synchronized display device to the mobile device 202 or the image or information provided from the mobile device 202 to the synchronized display device can vary depending on whether the type of mobile device 202 is a cell phone, smart phone, PDA, or PAD, etc.

Furthermore, the user information for the mobile device 202 can include the age or gender of the user, and the synchronized display device can customize or restrict the images or information provided on the mobile device 202 based on the user's information.

For example, if an image provided on a TV set is a program having an age restriction, the synchronized display device can refer to the user's age and restrict image sharing with the mobile device 202, and can vary the supplementary information for an image according to gender when providing it to the mobile device 202.

Figure 8:
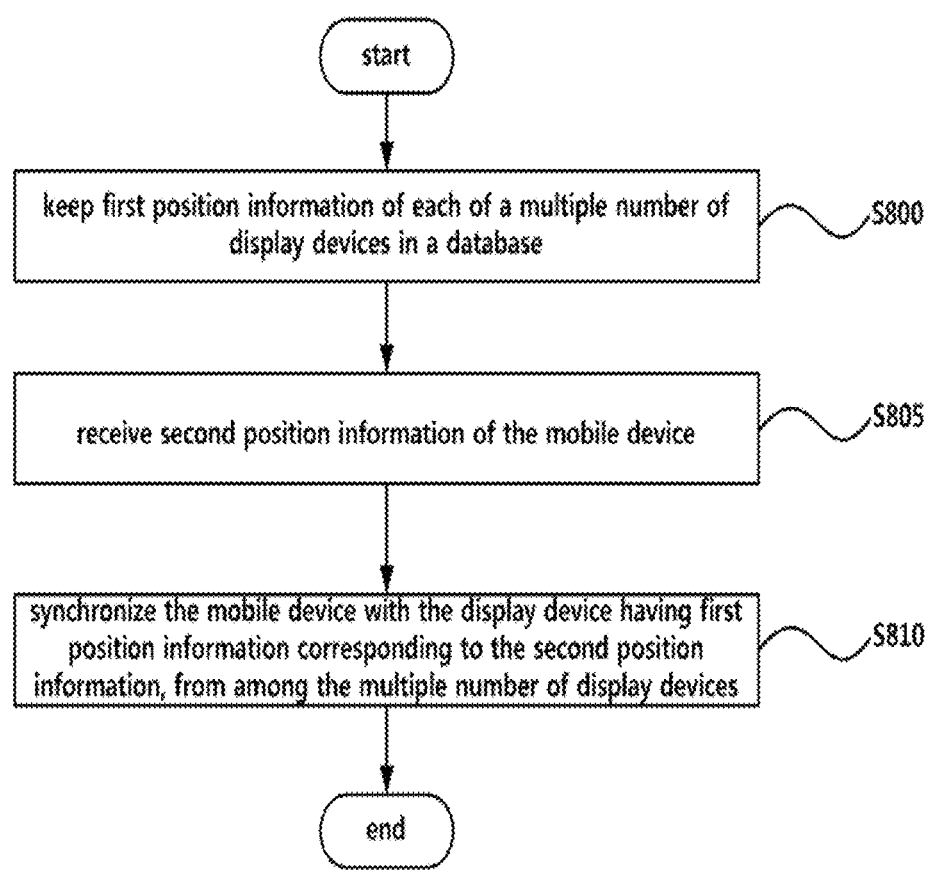
FIG. 8 is a flowchart illustrating the overall flow of a method for synchronization between a mobile device and a display device according to an embodiment of the invention.

FIG. 8 is a flowchart illustrating the overall flow of a method for synchronization between a mobile device and a display device according to an embodiment of the invention.

The procedures performed in each operation are described below with reference to FIG. 8.

First, in operation S800, the first position information of each of a multiple number of display devices may be kept in a database. That is, the first position information may be stored in the storage part 302, and updates may be performed every time there is a change in first position information.

Then, in operation S805, the second position information may be received from the mobile device. The second position information can be received from the mobile device periodically, or whenever there is a change in second position information.

Lastly, in operation S810, synchronization may be performed between the mobile device and the display device having first position information corresponding to the second position information, from among the multiple number of display devices.

According to an embodiment of the invention, the synchronization device can be included in the mobile device.

That is, the mobile device can include a receiving part (not shown) that receives first position information from each of the multiple number of display devices or a storage part (not shown) that stores the first position information, and can include a measuring part (not shown) that measures the second position information of the mobile device. It may also include a synchronizing part for performing synchronization using the first position information and the second position information. In this case, the features of the synchronizing part 306 described above with reference to FIGS. 2 to 7 can be applied as is to this embodiment also. Therefore, a description of further details is omitted.

According to another embodiment of the invention, the synchronization device can be included in a display device, in which case the display device may store its first position information, receive the second position information from a mobile device, and perform synchronization if the second position information and the first position information correspond with each other.

The embodiments of the present invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A synchronization device for synchronization between a mobile device and a display device, the synchronization device comprising:
   a storage part configured to store first position information of each of a plurality of display devices;
   a receiving part configured to receive second position information of the mobile device; and
   a synchronizing part configured to synchronize the mobile device with a display device having the first position information corresponding to the second position information, from among the plurality of display devices,
   wherein the first position information comprises at least one of the first area information and first direction information, the first area information relating to areas in which the plurality of display devices are positioned, and the first direction information relating to directions in which the plurality of display devices are pointing,
   and wherein the second position information comprises at least one of second area information and second direction information, the second area information relating to an area in which the mobile device is positioned, and the second direction information relating to a direction in which the mobile device is pointing.

2. The synchronization device of claim 1, wherein the synchronizing part selects a display device having the first area information corresponding to the second area information, from among the plurality of display devices, and synchronizes the mobile device with the selected display device,
   and wherein a corresponding between area information means that the first area information and the second area information are alike.

3. The synchronization device of claim 2, wherein, if there are a plurality of display devices having the first area information corresponding to the second area information,
   the synchronizing part selects a display device having the first direction information corresponding to the second direction information, from among the display devices having the first area information corresponding to the second area information, and synchronizes the mobile device with the selected display device,
   and wherein a corresponding between direction information means that the mobile device and the display device point in directions facing each other.

4. The synchronization device of claim 3, wherein, if there are a plurality of display devices having the first direction information corresponding to the second direction information,
   the synchronizing part selects a display device closest to the mobile device, from among the display devices having the first direction information corresponding to the second direction information, and synchronizes the mobile device with the selected display device.

5. The synchronization device of claim 1, wherein the storage part further stores first profile information of the display device synchronized with the mobile device and second profile information of the mobile device,
   the synchronization device further comprises a profile transmitting part configured to transmit the first profile information to the mobile device and transmit the second profile information to the synchronized display device, and the mobile device and the synchronized display device perform a particular action based on the first profile information or the second profile information.

6. The synchronization device of claim 5, wherein the first profile information comprises type information of the synchronized display device, and the second profile information comprises at least one of type information of the mobile device and information on a user using the mobile device.

7. The synchronization device of claim 6, wherein the user information comprises at least one of an age and a gender of the user, and the synchronized display device customizes or restricts an image or information provided on the mobile device based on the user information.

8. The synchronization device of claim 5, wherein the particular action comprises at least one of:

sharing an image displayed on the mobile device or the synchronized display device with each other, controlling the synchronized display device by using the mobile device, controlling the mobile device by using the synchronized display device, displaying supplementary information on the mobile device for an image displayed on the synchronized display device, and displaying on the synchronized display device information requested by a user of the mobile device.

9. The synchronization device of claim 1, wherein the mobile device obtains the second direction information by using at least one of a geomagnetic sensor, a gyro sensor, and a gravity sensor included in the mobile device.

10. The synchronization device of claim 1, wherein, if there are a plurality of mobile devices having the second position information corresponding to the first position information of any one of the plurality of display devices, the synchronizing part synchronizes the plurality of mobile devices with the one display device such that a screen included in the one display device is divided and controlled by the plurality of mobile devices.

11. The synchronization device of claim 1, wherein, if a screen included in the display device to be synchronized with the mobile device has a size greater than or equal to a preset value, the synchronizing part synchronizes the mobile device with the to-be-synchronized display device such that the mobile device controls a partial area of the screen.

12. A mobile device configured to perform synchronization with a display device, the mobile device comprising:

a receiving part configured to receive first position information of each of a plurality of display devices;

a measuring part configured to measure second position information of the mobile device; and a synchronizing part configured to synchronize the mobile device with a display device having the first position information corresponding to the second position information, from among the plurality of display devices, wherein the first position information comprises at least one of first area information and first direction information, the first area information relating to areas in which the plurality of display devices are positioned, and the first direction information relating to directions in which the plurality of display devices are pointing, and wherein the second position information comprises at least one of second area information and second direction information, the second area information relating to an area in which the mobile device is positioned, and the second direction information relating to a direction in which the mobile device is pointing.

13. A display device configured to perform synchronization with a mobile device, the display device comprising:

a storage part configured to store first position information of the display device;

a receiving part configured to receive second position information of the mobile device; and a synchronizing part configured to synchronize the display device with the mobile device if the second position information corresponds to the first position information, wherein the first position information comprises at least one of first area information and first direction information, the first area information relating to an area in which the display device is positioned, and the first direction information relating to a direction in which the display device is pointing, and wherein the second position information comprises at least one of second area information and second direction information, the second area information relating to an area in which the mobile device is positioned, and the second direction information relating to a direction in which the mobile device is pointing.

* * * * *